United States Patent
Shelest et al.

(10) Patent No.: US 7,549,158 B2
(45) Date of Patent: Jun. 16, 2009

(54) METHOD AND SYSTEM FOR CUSTOMIZING A SECURITY POLICY

(75) Inventors: Art Shelest, Sammamish, WA (US); Richard Paul Tarquini, Cary, NC (US)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 10/930,713

(22) Filed: Aug. 31, 2004

(65) Prior Publication Data

US 2006/0048209 A1 Mar. 2, 2006

(51) Int. Cl.
*G06F 17/00* (2006.01)

(52) U.S. Cl. ............... 726/1; 726/2; 726/3; 726/27; 709/22

(58) Field of Classification Search ............ 726/1, 726/2, 3, 18, 21, 27; 709/22
See application file for complete search history.

(56) References Cited

U.S. PATENT DOCUMENTS

| | | | | |
|---|---|---|---|---|
| 5,950,195 | A * | 9/1999 | Stockwell et al. | 707/4 |
| 6,412,070 | B1 * | 6/2002 | Van Dyke et al. | 726/17 |
| 6,678,827 | B1 * | 1/2004 | Rothermel et al. | 726/6 |
| 7,039,948 | B2 * | 5/2006 | Harrah et al. | 726/6 |
| 7,380,267 | B2 * | 5/2008 | Arai et al. | 726/1 |
| 2003/0110397 | A1 * | 6/2003 | Supramaniam et al. | 713/201 |
| 2003/0135759 | A1 * | 7/2003 | Kim et al. | 713/201 |
| 2004/0181690 | A1 * | 9/2004 | Rothermel et al. | 713/201 |
| 2004/0225877 | A1 * | 11/2004 | Huang | 713/100 |
| 2005/0022018 | A1 * | 1/2005 | Szor | 713/201 |
| 2005/0240990 | A1 * | 10/2005 | Trutner et al. | 726/11 |
| 2006/0005227 | A1 * | 1/2006 | Samuelsson et al. | 726/1 |
| 2006/0161965 | A1 * | 7/2006 | Shelest et al. | 726/1 |

OTHER PUBLICATIONS

B. Moore et al., "Policy Core Information Model—Version 1 Specification (RFC 3060)", Feb. 2001, Network Working Group, Version 1.*
Zhang et al., "An agent based architecture for supporting application level security", DARPA Information Survivability Conference and Exposition, 2000. DISCEX '00. Proceddings, vol. 1, Jan. 25-27, 2000, pp. 187-198 vol. 1.*
U.S. Appl. No. 11/039,637, filed Jan. 19, 2005, Shelest et al.
U.S. Appl. No. 11/150,819, filed Jun. 9, 2005, Shelest et al.

* cited by examiner

*Primary Examiner*—Kimyen Vu
*Assistant Examiner*—April Y Shan
(74) *Attorney, Agent, or Firm*—Perkins Coie LLP

(57) ABSTRACT

An intrusion detection system for customizing a security policy that detects an attempt to exploit a vulnerability is provided. A security policy contains criteria and a procedure. The criteria specify attributes of a security event that may be an exploitation, and the procedure specifies instructions to be performed that indicate when a security event may be an exploitation. When the criteria and the procedure both indicate that a security event may be an exploitation, then the security event matches the security policy and an appropriate action is taken. The intrusion detection system allows a user to modify the criteria to customize the security policy.

35 Claims, 5 Drawing Sheets

*FIG. 2*

METHOD AND SYSTEM FOR CUSTOMIZING A SECURITY POLICY

TECHNICAL FIELD

The described technology relates generally to detecting and preventing an exploitation of a vulnerability of a computer system.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs or other computer programs executing on those computer systems. One of the most destructive methods of attacking a computer system has been to send a "worm" to a computer program. A worm is a self-propagating attack that exploits a vulnerability by taking control of the computer system and using that computer system to launch attacks (i.e., send the same worm) against other computer systems with the same vulnerability.

A worm is a message or sequence of messages designed to exploit a vulnerability of the receiving computer program. Upon receiving the message or messages, the computer program performs some action that allows the worm to take control of the computer system. Different vulnerabilities can be exploited in different ways, such as by sending network packets, streaming data, accessing a file system, modifying registry or configuration data, and so on, which are referred to as security events.

Developers of applications and administrators of computer systems go to great effort and expense to identify and remove vulnerabilities. Because of the complexity of applications, however, it is virtually impossible to identify and remove all vulnerabilities before applications are released. After an application is released, developers can become aware of vulnerabilities in various ways. A party with no malicious intent may identify a vulnerability in an application and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances.

Intrusion detection systems have been developed that can be used to identify whether an attempt is being made to exploit a known vulnerability that has not yet been patched. These intrusion detection systems may define a "signature" for each way a vulnerability can be exploited. For example, if a vulnerability can be exploited by sending a certain type of message with a certain attribute, then the signature for that exploitation would specify that type and attribute. When a security event, such as the receipt of a message, occurs, the intrusion detection system checks its signatures to determine whether any match the security event. If so, then the intrusion detection system may take action to prevent the exploitation, such as dropping the message.

Signatures for newly discovered exploitations of vulnerabilities can be created in different ways. Developers of intrusion detection systems may create and distribute new signatures when they become aware of new exploitations. Such signatures may be implemented as executable code that is specifically designed to detect and prevent a newly discovered exploitation. An administrator can then install the new signatures to prevent the exploitation. A developer may not, however, provide signatures for all known exploitations. For example, the vulnerability may be in a special-purpose application program that the developer does not support. To prevent exploitation of such vulnerabilities, intrusion detection systems may allow administrators to create their own signatures. These intrusion detection systems may provide a signature creation tool that lists various attributes of a security event and allows an administrator to set the values of those attributes to define the signature and actions to be taken to prevent the exploitation. When a security event matches the attribute values of the signature, then the intrusion detection systems takes the associated actions.

A difficulty with these intrusion detection systems is that since an administrator can only set the values for a limited set of security event attributes using the signature creation tool, the administrator may not be able to create signatures for certain exploitations. In such a case, a programmer would need to develop a signature with executable code for detecting and preventing the exploitation. Such development can be very expensive and time-consuming. Another difficulty is that the signature distributed by a developer of an intrusion detection system may result in a behavior that is not desired by the administrator. For example, the signature may be conservative in its assumption of which types of messages might exploit a vulnerability and discard all those messages. Such conservative assumption may result in many messages being discarded as a result of false positive detections. An administrator, however, may know that certain types may not be a problem in the environment of their computer system. When the desired signature cannot be created using the signature creation tool, the administrator may have no choice but to develop the executable code for the signature. It would be desirable to provide a tool that would allow an administrator to develop signatures that meet their needs without having to resort to developing custom executable code.

SUMMARY

An intrusion detection system for customizing a security policy that detects an attempt to exploit a vulnerability is provided. A security policy contains criteria and a procedure. The criteria specify attributes of a security event that may be an exploitation, and the procedure specifies instructions to be performed that indicate when a security event may be an exploitation. If the criteria and the procedure both indicate that a security event may be an exploitation, and the security event matches the security policy, then an appropriate action is taken. The intrusion detection system allows a user to modify the criteria to customize the security policy in a way that has the capabilities of a procedure without having to develop a procedure.

BRIEF DESCRIPTION OF THE DRAWINGS

FIG. 2 illustrates a display page for modifying the scope of a packet-based security policy in one embodiment.

DETAILED DESCRIPTION

Figure 1:
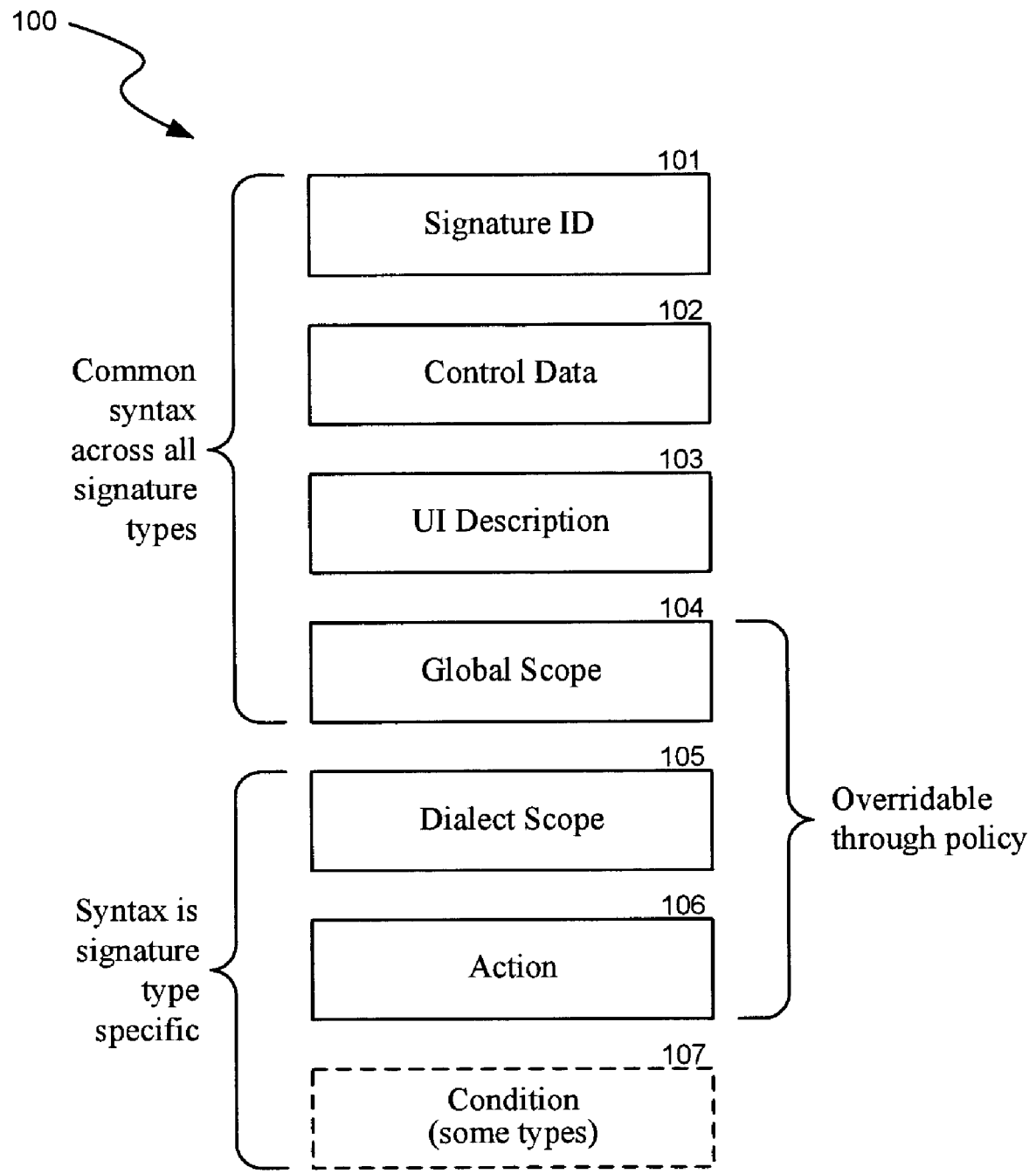
FIG. 1 is a block diagram that illustrates the sections of a signature policy in one embodiment.

A method and system for customizing a security policy for detecting an attempt to exploit a vulnerability is provided. In one embodiment, the detection system provides security policies, which are a type of signature, that include a condition section and a scope section used to detect whether an attempt is being made to exploit the vulnerability that is the target of the security policy. The condition section contains a procedure, such as instructions or operation codes, to be performed to determine whether a security event satisfies the condition of the security policy. The scope section contains criteria defining whether a security event is within scope of the security policy. A security event that is within scope of a security policy and satisfies the condition of the security policy "matches" the security policy. To determine whether a security event matches a security policy, the detection system first determines whether the security event is within scope of the security policy. If the security event is within scope, then the detection system determines whether the security event satisfies the condition of the security policy. If it does, then the security event matches the security policy, and the detection system takes the appropriate action such as preventing exploitation of the vulnerability.

The detection system allows a user to customize a security policy by modifying the scope section of the security policy. The criteria of the scope section indicate the values of various attributes of a security event that need to be satisfied for the security event to be within scope. For example, an attribute may be the source address or destination port of a network packet, and a network packet security event may be within scope of the security policy when its source address and destination port are the same as specified in the scope section of the security policy. Because a security policy has a scope section that can be modified by a user and a condition section containing a procedure, an administrator can develop a security policy that takes advantage of procedures developed by others, but at the same time can be customized without needing to develop new, or modify existing, procedures. Moreover, such customization can significantly reduce the number of false positive detections.

In one embodiment, the detection system may provide a procedure engine that performs the procedure of a condition by interpreting the instructions of the procedure. The programming language of the procedure engine may be a subset of a conventional programming language (e.g., C++) or a special-purpose programming language developed specifically for determining whether a security event matches the security policy. Such a special-purpose programming language may provide instructions for manipulating attributes of the security event, computer system parameters (e.g., operating system version), environment and parameters (e.g., date), and so on. The programming language may provide a stack-based metaphor in which results of computation are pushed onto a stack, which can then be used in subsequent computations. When the execution of a procedure completes, the top element of the stack may indicate whether the condition of the security policy has been satisfied.

In one embodiment, the detection system may allow a user to specify the action to be taken when a security event matches a security policy, such as discard a packet or terminate a session. The action of a security policy can be specified by default or explicitly. If a security policy does not include an action section, then a default action, which may be specific to the type of security policy (e.g., packet-based security policy or stream-based data security policy), is taken when a security event matches the security policy. If a security policy does include an action section, then that explicit action is taken when a security event matches the security policy. A user can override the action of a security policy by specifying a new action, which the detection system stores in the action section of the security policy.

In one embodiment, the detection system may allow a criterion of a scope section to be locked to prevent a user from modifying that locked criterion. A developer of a security policy may lock certain criteria to limit the amount of customization that can be performed by user. For example, a security policy may be directed to detecting an exploitation via a network packet that has a certain source address. The developer may lock the criterion of the source address so that it cannot be modified by a user. Because the developer developed the condition of the security policy to process only network packets from that source address, the developer may not want that same condition applied to a network packet from any other source address.

In one embodiment, the detection system takes various actions depending on whether a rating for a security event that matches a security policy exceeds a rating threshold. The detection system calculates an overall rating for a security event that matches a security policy. An administrator can then set a threshold rating that the detection system uses when determining whether to take an action of a security policy. For example, if the rating of a security event/policy combination is 75 (within a range of 0-100) and the threshold is 80, then the detection system will not take the action. In contrast, if the threshold is 50, then the detection system will take the action. The detection system may also allow an administrator to set multiple thresholds and additional actions to be taken when a security event/policy combination exceeds a threshold. For example, an administrator may set a low threshold at 40 and indicate that the security event is to be logged, but the action of the security policy is not to be taken. The administrator may also set a high threshold at 80 and indicate that the security event is to be logged and the action of the security policy is to be taken. Thus, when the rating of a security event/policy combination exceeds the low threshold, but not the high threshold, the security event is simply logged. If the rating is below the low threshold, then no action is taken.

The detection system may base the overall rating of a security event/policy combination on static data of the security policy and dynamic data of the security event. The static data of a security policy may include severity of the exploitation that the security policy is designed to detect and confidence that the security policy will correctly detect attempts to exploit the vulnerability. The severity and confidence may be expressed numerically (e.g., 0-100) or descriptively (e.g., high, medium, and low). The dynamic data of the security event may include attributes that are generally applicable to a certain type of security event. For example, one attribute may be the direction (i.e., incoming or outgoing) of a network packet, and another attribute may be the source address of a network packet. The detection system may allow an administrator to set a value rating for each attribute. For example, an administrator may set the value rating for incoming to 100 and the value rating for outgoing to 50. The detection system may calculate the overall rating for a security event/policy combination by taking a weighted average of the rating contributions of the static data and the dynamic data. The detection system may weight confidence and severity equally when calculating the rating contribution of the static data. For example, a severity of 75 and a confidence of 95 would be combined to a rating contribution of 85 (i.e., (75+95)/2). Similarly, the detection system may weight the value rating of each attribute equally when calculating the rating contribution of the dynamic data. For example, a rating value of 100 for direction and 30 for source address would be combined to a rating contribution of 65 (i.e., (100+30)/2). The detection system can then weight the rating contribution of the static and dynamic data equally to give an overall rating of 75 (i.e., (85+65)/2). One skilled in the art will appreciate that the weights can be linear or non-linear and can be predefined or set by an administrator. By using thresholds that apply to multiple security policies, an administrator can avoid having to define multiple versions of a security policy for various attributes of a security event and multiple actions to be taken depending on severity and confidence of a security policy.

FIG. 1 is a block diagram that illustrates the sections of a security policy in one embodiment. The security policy includes a signature identification section 101, a control data section 102, a user interface description section 103, a global scope section 104, a dialect scope section 105, an action section 106, and a condition section 107. Sections 101-104 have a syntax that is common for all types of security policies, and sections 105-107 have a syntax that is specific to the type of security policy. For example, a packet-based security policy and a stream-based security policy may have different syntaxes for sections 105-107. The detection system allows a user to modify the scope sections and action sections. The signature identification section contains a unique identifier including version number for the security policy. The control data section contains information that is used to determine how the security policy is interpreted and what actions may be taken. For example, the control data section may specify the type of security policy and the severity of the exploitation. Different default actions may be taken depending on the type and severity. The user interface description section contains information displaying the security policy to a user. For example, the user interface description section may include the title or name of the security policy. The global scope section specifies attributes that are common to all types of security policies. For example, the global scope section may specify an operating system version attribute, which is an attribute that all types of security policies may need to use. The dialect scope section specifies attributes that are specific to the type of security policy. For example, a packet-based security policy may have a fragments attribute indicating whether processing should be performed before or after reassembly, whereas a stream-based security policy would have no need for a fragments attribute. The action section specifies one or more actions that are to be taken when a security event matches a security policy. For example, the action may be to discard a packet. The condition section contains the procedure that is to be performed to determine whether a security event satisfies the condition of the security policy. For example, the condition section may contain instructions that parse out certain portions of a field of a network packet and compare that portion to a configuration parameter of the operating system or known malicious pattern.

Figure 2:
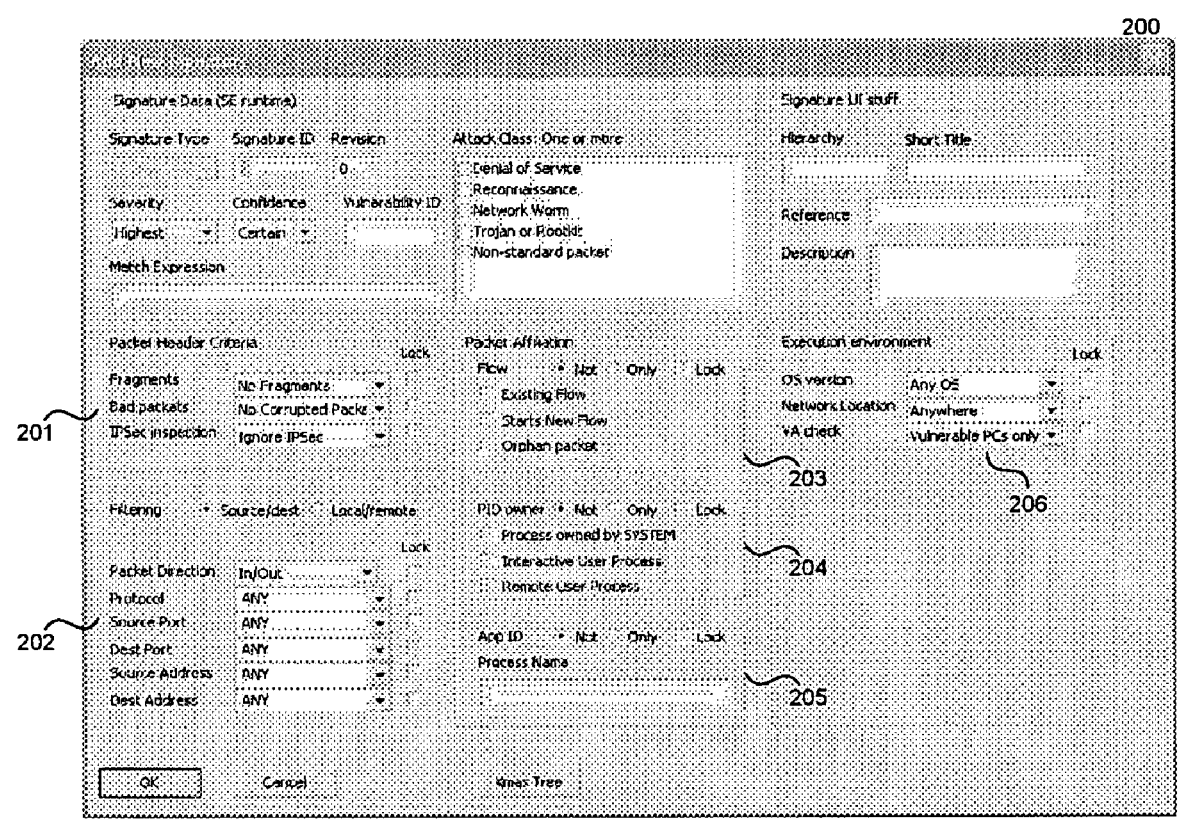

FIG. 2 illustrates a display page for modifying the scope of a packet-based security policy in one embodiment. Display page 200 includes a dialect scope portion including a packet header criteria portion 201, a filtering portion 202, a packet affiliation portion 203, a process identification portion 204, and an application identification portion 205, and a global scope portion including an execution environment portion 206. The packet header criteria portion allows a user to specify values for packet header related attributes. The filtering portion allows a user to specify values for source and destination related attributes. The packet affiliation portion allows a user to specify the values for flow related attributes. The process identification portion allows a user to specify values for attributes related to the owner of the destination process. The application identification portion allows a user to specify attributes related to the destination application. The execution environment portion allows a user to specify the attributes associated with the global scope.

Figure 3:
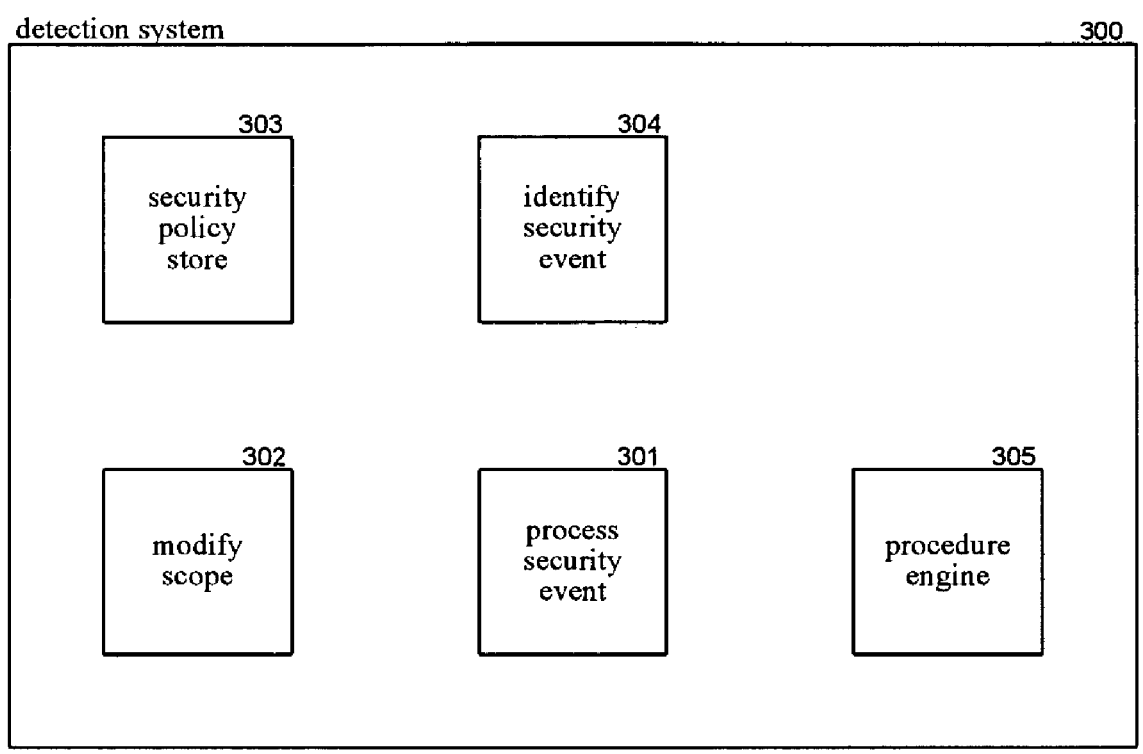
FIG. 3 is a block diagram illustrating the components of the detection system in one embodiment.

FIG. 3 is a block diagram illustrating the components of the detection system in one embodiment. The detection system 300 includes a process security event component 301, a modify scope component 302, a security policy store 303, an identify security event component 304, and a procedure engine 305. The security policy store contains the security policies that are currently defined for the detection system. The identify security event component identifies when a security event occurs and notifies the process security event component. The process security event component identifies the security policies of the security policy store for which the security event is within scope. The process security event component then invokes the procedure engine for the identified security policies to determine whether the security event satisfies the conditions. If so, then the process security event component performs the action associated with the security policies. The process security event component may stop processing the security policies when a match is detected or may continue processing additional security policies taking the actions of each matching security policy. The modify scope component provides a user interface, such as that of FIG. 2, through which a user can modify the scope of the security policies.

The computing device on which the detection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the detection system.

The detection system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
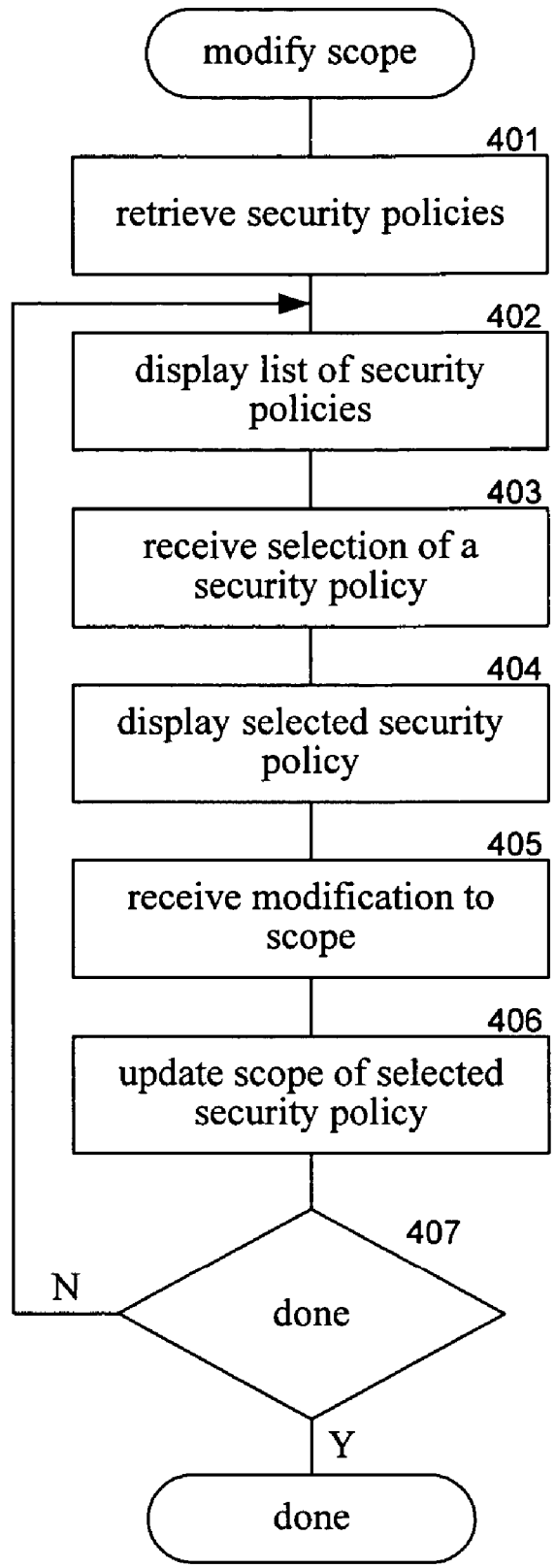
FIG. 4 is a flow diagram that illustrates the processing of the modify scope component in one embodiment.

FIG. 4 is a flow diagram that illustrates the processing of the modify scope component in one embodiment. In block 401, the component retrieves the security policies from the security policy store. In blocks 402-407, the component loops allowing a user to select and modify a security policy. In block 402, the component displays a list of the retrieved security policies. In block 403, the component receives a selection of a security policy from a user. In block 404, the component displays the selected security policy. In block 405, the component receives from a user a modification to the scope section of the displayed security policy. In block 406, the component updates the scope section of the displayed security policy. In decision block 407, if the user has completed modifying the security policies, then the component completes, else the component loops to block 402 to repeat the processing for another security policy.

Figure 5:
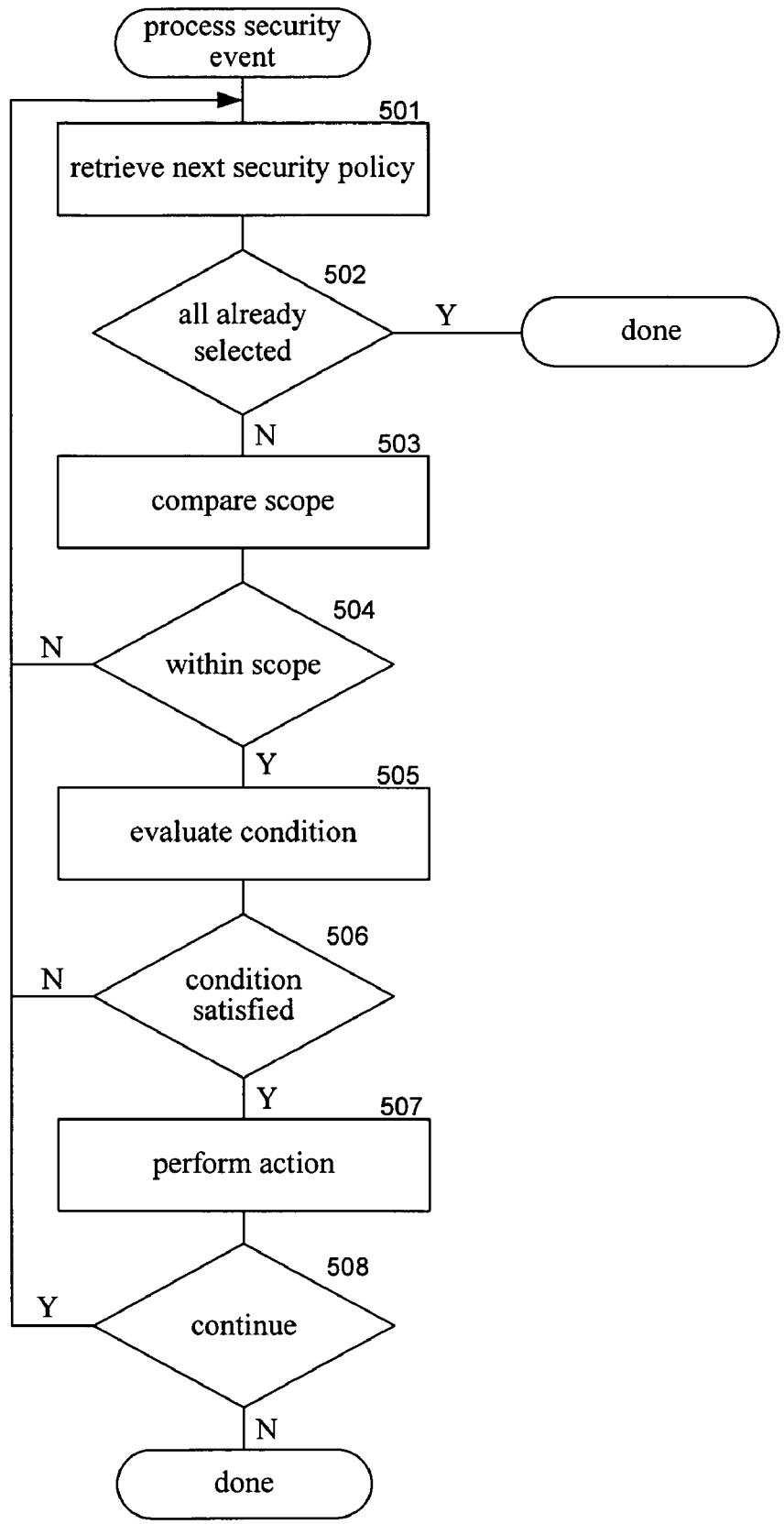
FIG. 5 is a flow diagram that illustrates the processing of the process security event component in one embodiment.

FIG. 5 is a flow diagram that illustrates the processing of the process security event component in one embodiment. The component is invoked when a security event is detected. In blocks 501-508, the component loops selecting each security policy and determining whether the security event matches the security policy. In block 501, the component retrieves the next security policy from the security policy store. In decision block 502, if all the security policies have already been retrieved, then the component completes, else the component continues at block 503. In block 503, the component determines whether the security event satisfies the criteria of the scope (i.e., is within scope) of the selected security policy. In decision block 504, if the security event is within scope, then the component continues at block 505, else the component loops to block 501 to select the next security policy. The detection system may use a data structure to narrow the list of security policies that may be within scope. For example, the detection system may index the security policies by type or by operating system version. In block 505, the component determines whether the security event satisfies the condition of the selected security policy. The component may invoke the procedure engine to perform the procedure of the condition. In decision block 506, if the condition is satisfied, then the component continues at block 507, else the component loops to block 501 to retrieve the next security policy. In block 507, the component takes the action of the retrieved security policy. The action may be a default action or specified in the action section of the security policy. In decision block 508, if the component is to continue processing security policies, then the component loops to block 501 to retrieve the next security policy, else the component completes.

In the following, the syntax and semantics of the sections of the security policies in one embodiment are defined.

A. Signature Identification Section

The signature identification section contains the following elements:

| Name | Parameter | Description |
| --- | --- | --- |
| /SID | XNN.nn | Identification of the security policy where X is a domain letter, NN is a number, and nn is a revision number |

The revision number is used to differentiate multiple versions of the same signature, determine signature seniority (i.e., highest revision number), and track security events associated with a signature on a per-revision or an across-all-revisions basis. The detection system may allow an administrator to select whether maintenance is to be performed on all versions of a security policy or just certain versions. For example, an instruction to disable "M55" would disable all versions of that security policy, while an instruction to disable "M55.8" would disable only version 8 of that security policy.

B. Control Data Section

The security policy control data section is used to determine which component interprets the signature and what action will be taken, unless an explicit action is specified. The control data section contains the following elements (the names of the elements are descriptive of their function):

| Name | Values |
| --- | --- |
| /TYPE | PACKET\|STREAM\|FILE\|REGISTRY\|COUNTER |
| /SEVERITY | HIGH\|MEDIUM\|LOW |
| /CONFIDENCE | HIGH\|MEDIUM\|LOW |
| /CLASS | DOS RECON WORM TROJAN BAD |
| /VULNERABILITY | KB123456 |

C. User Interface Description Section

The user interface description section is used in displaying the security policy to an administrator. The user interface description section contains the following elements (the names of the elements are descriptive of their function):

| Name | Values |
| --- | --- |
| /TITLE | The title of the security policy |
| /REFERENCE | A URL to more information about the security policy |
| /DESCRIPTION | The description of the security policy |
| /HIERARCHY | A hierarchical organization of the security policies |

D. Scope Section

A security policy includes a global scope section and a dialect scope section. The global scope section is common to all security policies regardless of type. A security policy contains one global scope section and one dialect scope section. An element with an exclamation mark (!) immediately after the element name and before the colon separating it from its parameters; indicates that the element is locked.

The global scope section contains the following elements:

| Name | Parameters | Description |
| --- | --- | --- |
| /OSVER | [<\|>\|<=\|>=] | Major.minor - enable for specified OS versions |
| /VACHECK | YES\|NO | Performs vulnerability check regardless of the resilience of the OS to this exploitation |

E. Type-Specific Sections

The dialect scope section, action section, and condition section are described per security policy type, since they are security policy dependent.

1. Packet-Based Security Policy a. Dialect Scope Section

The dialect scope section for a packet-based security policy contains the following elements:

| Name | Parameters | Description |
| --- | --- | --- |
| /FRAGMENTS | YES\|NO\|ONLY | Specifies to process fragments, reassembled fragments, and only fragments |
| /BADPACKETS | YES/NO/ONLY | Specifies whether the security policy is to process corrupted packets |

-continued

| Name | Parameters | Description |
| --- | --- | --- |
| /IPSEC | YES/NO/ONLY | Specifies whether the security policy should look inside IPSec packets by looking at them after they are decrypted |
| /DIRECTION | IN/OUT/INOUT/ALL | Specifies packet direction |
| /PROTOCOL | Protocol | Specifies protocol of the packet (TCP, UDP, ICMP, etc.) |
| /ADDRLOCAL | LocalAddr | Specifies endpoints in the local/remote convention |
| /ADDRREMOTE | RemoteAddr | |
| /PORTLOCAL | LocalPort | |
| /PORTREMOTE | RemotePort | |
| /ADDRSRC | SrcAddr | Specifies endpoints in the source/destination convention |
| /ADDRDST | DstAddr | |
| /PORTSRC | SrcPort | |
| /PORTDST | DstPort | |
| /FLOW | [-]NEW\|[-]OLD\|[-]NONE | Specifies packet affiliation with a flow (i.e., a "stateful" communication session) |
| /PIDCLASS | [-]OS\|[-]USER | Specifies process identification class of the packet owner |
| /APPID | [-]<some string> | Specifies application with which the packet is associated on this host |
| /CONDITION | string | Arithmetic/boolean condition using C/C++ format described below | b. Action Section

The action section for a packet-based security policy contains the following elements:

| Name | Parameters | Description |
| --- | --- | --- |
| /ACTION | DROP\|PASS\|RESET\|DEFAULT | Specifies action to take when the packet matches the security policy |
| /EVENT | LOG\|NO\|DEFAULT | Specifies to generate an event when the packet matches the security policy | c. Condition Section

Packet conditions follow the C/C++ arithmetic/logical expression format. For example, "(ip.flag & IPFLAG_DF) && (ip.ttl>128)" is an expression that identifies the packets with TTL greater than 128 that is not to be fragmented. The condition section of a packet-based security policy contains the following elements:

| Name | Description |
| --- | --- |
| Operators | Operators are plus, minus, multiply operations, parentheses, boolean ops, etc. These follow the syntax and execution order of C/C++. |
| Input fields | Input fields are system entities that the detection system can monitor. For example, the procedure engine is able to monitor packets, so it operates with fields based on packets. Input fields change from one invocation of a security policy to the next. |
| Macros | Macros are numeric values (e.g., IPFLAG_MF). Macros do not change from one security policy invocation to the next. |
| Functions | Operations that cannot be efficiently expressed through mathematics are represented as functions. There are global functions (e.g., abs(x)) and class functions (e.g., tcp.PayloadLength( )). |

| Name | Description |
| --- | --- |
| Collections | Collections are configured by an administrator or through the policy (e.g., $CORPNET variable that describes all ranges of IP addresses for the corporation). Collections are common for all security policies. |

A procedure for a packet-based security policy contains the following input fields:

| Field name | Translates into | Description |
| --- | --- | --- |
| ip.version | p3[0] >> 4 | IP version (always = 4) |
| ip.hdrLen | p3[0] & 0xf | IP header length |
| ip.tos | p3[1] | TOS (Type of Service) |
| ip.id | p3[4:n2] | Used for fragment reassembly |
| ip.length | p3[2:n2] | Stated IP datagram length |
| ip.flags | p3[6] >> 5 | IP packet flags |
| ip.offset | p3[6:n2] & 0x1fff | Fragment offset, in 8-byte increments |
| ip.ttl | p3[8] | TTL |
| ip.protocol | p3[9] | Protocol (1 = ICMP, etc.) |
| ip.checksum | p3[10:n2] | IP header checksum |
| ip.srcIP | p3[12:n4] | Source IP address |
| ip.dstIP | p3[16:n4] | Destination IP address |
| ip.payload[X:Y] | p4[X:Y] | Y bytes at offset X of IP payload |
| tcp.srcPort | p4[0:n2] | Source port |
| tcp.dstPort | p4[2:n2] | Destination port |
| tcp.seq | p4[4:n4] | Sequence number |
| tcp.ack | p4[8:n4] | Acknowledgement number |
| tcp.hdrLen | p4[12] >> 4 | TCP header length |
| tcp.flags | p4[13] & 0x3f | TCP flags (6 bits) |
| tcp.window | p4[14:n2] | TCP advertised window |
| tcp.checksum | p4[16:n2] | TCP checksum |
| tcp.urgentPtr | p4[18:n2] | TCP urgent pointer |
| tcp.payload[X:Y] | p5[X:Y] | Y bytes at offset X of TCP payload |
| udp.srcPort | p4[0:n2] | Source port |
| udp.dstPort | p4[2:n2] | Destination port |
| udp.length | p4[4:n2] | Datagram length |
| udp.checksum | p4[6:n2] | UDP checksum |
| udp.payload[X:Y] | p5[X:Y] | Y bytes at offset X of UDP payload |
| icmp.type | p4[0] | ICMP type field (5 = redirect, etc.) |
| icmp.code | p4[1] | ICMP code, type-dependent |
| icmp.checksum | p4[2:n2] | ICMP checksum |
| icmp.id | p4[4:n2] | ICMP message identifier |
| icmp.seq | p4[6:n2] | ICMP message sequence |
| icmp.payload[X:Y] | p5[X:Y] | Y bytes at offset X of ICMP payload |

A procedure for a packet-type security policy uses the following functions. These can be implemented either natively or through preprocessor. The "Translates into" column reflects the preprocessor implementation.

| Function name | Translates into | Description |
| --- | --- | --- |
| ip.PacketSize( ) | len2 | Actual received packet size. This is not the same as ip.length field, which can misstate the length. |
| tcp.SegmentSize( ) | len2-p5 | Size of TCP payload. |
| ip.IsFragment ( ) | p3[6:n2] & 0x5fff | Indicates a fragment. |
| tcp.payload.Find(a,string) | Find(p5 + a,string) | Search for a string starting at offset A of the TCP payload. |

2. Stream-Based Security Policy a. Dialect Scope Section

The dialect scope section for a stream-based security policy contains the following elements:

| Name | Parameters | Description |
| --- | --- | --- |
| /DIRECTION | IN/OUT/ANY | Specifies stream direction. |
| /PROTOCOL | Protocol | Specifies protocol of the stream (TCP, UDP, RAW, etc.). |
| /ADDRLOCAL | LocalAddr | Specifies endpoints in the local/remote convention. |
| /ADDRREMOTE | RemoteAddr | |
| /PORTLOCAL | LocalPort | |
| /PORTREMOTE | RemotePort | |
| /ADDRSRC | SrcAddr | Specifies endpoints in the source/destination convention. |
| /ADDRDST | DstAddr | |
| /PORTSRC | SrcPort | |
| /PORTDST | DstPort | |
| /PIDCLASS | [-]OS|[-]USER | Specifies process identification class of the stream owner. |
| /APPID | [-]<some string> | Specifies application on this host with which the stream is associated. |
| /CONDITION | string | Arithmetic/boolean condition using C/C++ format. | b. Action Section

The stream action section for a stream security policy has the following elements:

| Name | Parameter |
| --- | --- |
| /ACTION | :NOP|RESET|DEFAULT |
| /EVENT | :LOG|NOP|DEFAULT | c. Condition Section

A stream-based security policy uses the same language as a packet-based security policy. A procedure for a stream-based security policy uses the following input fields:

| Field name | Description |
| --- | --- |
| Buffer.offset | 0-based offset in the stream, as tracked by the flow manager |
| Buffer.length | How big is this particular buffer |
| stream.protocol | Protocol (6 = TCP, etc.) |
| stream.srcIP | Source IP address |
| stream.dstIP | Destination IP address |
| stream.srcPort | Source port (for TCP and UDP) |
| stream.dstPort | Destination port (for TCP and UDP) |
| stream [X:Y] | Y bytes at offset X of the stream |
| Buffer [X:Y] | Y bytes at offset X of the buffer |
| stream.Find(a,string) | Find string starting at offset A in the stream, across buffers |
| Buffer.Find(a,string) | Find string starting at offset A of this buffer, this buffer only |

3. File-System-Based Security Policies

A file system may be organized into drives, folders, and files. Unlike a registry that for the most part follows the same structure on all computers, file systems are custom because users have a choice of where given software will be installed. Because of this, pinpointing a specific file or directory may be difficult in the enterprise context. In part, this problem is solved by using macros that are host-specific. For example, $SYSTEMROOT macro corresponds to the directory in which the operating system is installed.

The scope section of the file-system-based security policy contains the following elements:

| Name | Parameters | Description |
| --- | --- | --- |
| /FILEPATH | path | Specifies name of the directory to scan. |
| /FILENAME | name | Specifies to only scan files matching specified name (wildcards are allowed). |
| /SUBDIR | name | Specifies to only look in subdirectories matching specified name (wildcards are allowed). |
| /DEPTH | 0|1|*Depth | Specifies the depth of subdirectories to scan. |
| /FORCE | YES|NO | Specifies whether to temporarily change permissions if the subdirectory or file is not accessible with existing permissions. |
| /CHECK | <string of single-letter detect codes> | The meaning of detect codes is described in the table below. |

The detect codes specify to check for certain changes to or conditions of the file system. The detect codes are defined in the following:

| Nature of change | Change code | Description |
| --- | --- | --- |
| New object created | n | New directory or file was created |
| Existing object removed | r | A directory or file was removed |
| Timestamp changed | m | Directory or file was written |
| Data changed | d | Content of the file has changed |
| Data size changed | s | Directory size of file size is different |
| Object order changed | o | Order of files or directories changed |
| Permissions changed | p | Object permissions are different |
| Object attributes changed | x | Directory or file attributes changed (SHAR+) |
| Any change | y | Corresponds to all codes above |
| Access denied | a | Cannot access an object (not a diff detect) |
| Object is present/missing | e/−e | Directory or file exists (e) or is absent (−e) |
| Object size is zero | z | Directory or file is empty |
| Secondary stream | b | Secondary stream(s) detected |
| Hard link | h | Hard link directory or file found |

4. Registry-Based Security Policies

Registries may be organized much like a file system, with "keys" corresponding to directories and "values" corresponding to files. There are subtle differences, such as data items assigned to the keys and value types. The detection system can detect the following registry changes. Each registry entry or property is designated by a path, string of detection method codes, whether the scan can be forced (e.g., permissions temporarily changed to access a key), and the depth of the scan (single key or recursive).

| Name | Parameter | Description |
| --- | --- | --- |
| /REGPATH | path | Name of the subkey to scan. |
| /VALUE | name | Specifies to only scan values matching specified name (wildcards are allowed). |
| /SUBKEY | name | Specifies to only look at/in subkeys matching specified name (wildcards are allowed). |

-continued

| Name | Parameter | Description |
|---|---|---|
| /DATA | string | Specifies to only look in values matching the string. |
| /DEPTH | 0\|1\|* | Depth of subdirectories scanned. |
| /FORCE | YES\|NO | Specifies to temporarily change permissions if the subkey is not accessible with existing permissions. |
| /CHECK | <string of single-letter detect codes> | The meaning of detect codes is described in the table below. |

The detect codes are defined in the following:

| Nature of change | Change code | Comment |
|---|---|---|
| New object created | N | New key or value was created |
| Existing object removed | R | A key or value was removed |
| Timestamp changed | m | Key or value was written |
| Data changed | d | Value data has been changed |
| Data size changed | s | Value data size is different |
| Value type changed | t | Same value, different type (values only) |
| Object order changed | o | Order of objects changed |
| Permissions changed | p | Object permissions are different |
| Key class changed | c | Different key class string (keys only) |
| Key options changed | x | Options: volatile / non-volatile (key only) |
| Any change | y | Corresponds to all codes above |
| Access denied | a | Cannot access an object |
| Object is present/absent | e/−e | Key or value is found (e) or not found (−e) |
| Object size is zero | z | Key or value is empty |

5. System-Counter-Based Security Policies

The system-counter-based securities policies are directed to monitoring counters maintained by the system. The counters are named integer values organized in a tree structure:

\PerformanceObject\CounterName\InstanceName

Generally, there are two types of counters: incrementing counters and up/down counters. For example, number of network packets received is an incrementing counter (it can only go up until it rolls around), and the number of active TCP connection is an up/down counter.

The detection system allows simple and ratio thresholds to be defined. A simple threshold is a comparison of a counter to a limit, and a ratio threshold is a comparison of the ratio of two counters to a limit. The counters are normalized per second. A simple threshold is defined as:

$$OVER(AVE(C,T),V) >= Limit$$

A ratio threshold is defined as $$OVER(AVE(C1,T)/AVE(C2,T),V) >= Limit$$

where C is a counter, AVE is the average of counter C over elapsed time T, and OVER (X, V) is the time during which X was over threshold V.

The scope section of a system-counter-based security policy contains the following elements:

| | | |
|---|---|---|
| /COUNTER | PerformanceObject\CounterName[\Instance] | Specifies the name of the primary counter. |
| /COUNTER2 | PerformanceObject\CounterName[\Instance] | Specifies the name of the secondary counter used as denominator. |
| /TIME_AVE | sec | Specifies averaging period for counter(s). |
| /SIMPLE | V,Limit | Specifies simple threshold, V and Limit for the formula above. |
| /RATIO | V,Limit | Specifies ratio threshold, V and Limit for the formula above. |
| /EVENT | LOG\|NOP\|DEFAULT | Generate an IDS event once condition is met. |

From the foregoing, it will be appreciated that specific embodiments of the detection system have been described herein for purposes of illustration, but that various modifications may be made without deviating from the spirit and scope of the invention. For example, the scope of a security policy may include a patch level criterion indicating level of a patch, a security event may relate to buffered network data, and an activation of a security policy may be based on vulnerability resilience. Accordingly, the invention is not limited except as by the appended claims.

We claim:

1. A method in a computer system for customizing a security policy that is an implementation of a desired security policy for the computer system, the computer system having a processor and a memory, the method comprising:
   providing in the memory a security policy that includes scope, condition, and action information, the scope specifying criteria including values of attributes of a security event that need to satisfied for the security event to be within the scope of the security policy, the condition specifying a computer-executable procedure to be performed by the computer system based on values of attribute of the security event to determine whether a security event satisfies the condition of the security policy, and the action specifying an action to take when a within-scope security event satisfies the condition of the security policy;
   providing by the processor a user interface through which a user can modify the scope of the security policy but cannot modify the computer-executable procedure of the condition of the security policy; and when a security event occurs,
   determining by the processor whether the security event is within the modified scope of the security policy; and
   when it is determined that the security event is within the modified scope of the security policy,
      performing by the processor the procedure of the condition of the security policy to determine whether the security event satisfies the condition of the security policy and thus matches the security policy; and
      when it is determined that the security event matches the security policy, taking by the processor the action of the security policy.

2. The method of claim 1 wherein the scope includes source and destination criteria.

3. The method of claim 1 wherein the scope includes a patch level criterion.

4. The method of claim 1 wherein the scope includes an application criterion.

5. The method of claim 1 wherein the scope includes a user and system association criterion.

6. The method of claim 1 wherein the security event relates to a network packet.

7. The method of claim 1 wherein the security event relates to a data stream.

8. The method of claim 1 wherein the security event relates to a registry access.

9. The method of claim 1 wherein the security event relates to a file access.

10. The method of claim 1 wherein the security event relates to operating system status.

11. The method of claim 1 wherein when a criterion of the scope of the security policy is locked, prohibiting modification of the locked criterion by the user.

12. The method of claim 1 wherein multiple security policies are provided and the determining includes determining whether the security event is within the scopes of security policies.

13. The method of claim 1 wherein the action is a default action.

14. The method of claim 1 wherein the user can modify the action.

15. The method of claim 1 wherein the security event relates to buffered network data.

16. The method of claim 1 wherein activation of the security policy is based on vulnerability resilience.

17. A computer-readable storage medium containing instructions that control a computer system to customize a security policy that is an implementation of a desired security policy for the computer system, the instructions implementing a method performed by a processor of the computer system comprising steps of:
   providing a security policy that includes scope, condition, and action information, the scope specifying criteria including values of attributes of a security event that need to satisfied for the security event to be within the scone of the security policy, the condition specifying code of a computer-executable procedure to perform by the computer system based on the values of attributes of the security event to determine whether a security event satisfies the condition of the security policy, and the action specifying an action to take when a within-scope security event satisfies the condition of the security policy;
   receiving from a user modification to the scope of the security policy through a user interface, the user interface allowing the user to modify the scope of the security policy but not allowing the user to modify the computer-executable procedure of the condition of the security policy; and
   storing the modified scope as part of the security policy so that the security policy with the modified scope can be applied to security events, the applying of the security policy to security events including
      when a security event occurs,
         determining whether the security event is within the modified scone of the security policy; and
         when it is determined that the security event is within the modified scone of the security policy,
            performing the procedure of the condition of the security policy to determine whether the security event satisfies the condition of the security policy and thus matches the security policy; and
            when it is determined that the security event matches the security policy, taking the action of the security policy.

18. The computer-readable storage medium of claim 17 wherein the scope includes source and destination criteria.

19. The computer-readable storage medium of claim 17 wherein the scope includes a patch level criterion.

20. The computer-readable storage medium of claim 17 wherein the scope includes an application criterion.

21. The computer-readable storage medium of claim 17 wherein the scope includes a user and system association criterion.

22. The computer-readable storage medium of claim 17 wherein the security event relates to a network packet.

23. The computer-readable storage medium of claim 17 wherein the security event relates to a data stream.

24. The computer-readable storage medium of claim 17 wherein the security event relates to a registry access.

25. The computer-readable storage medium of claim 17 wherein the security event relates to a file access.

26. The computer-readable storage medium of claim 17 wherein the security event relates to operating system status.

27. The computer-readable storage medium of claim 17 wherein when a criterion of the scope of the security policy is locked, prohibiting modification of the locked criterion by the user.

28. The computer-readable storage medium of claim 17 wherein multiple security policies are provided and the determining includes determining whether the security event is within the scopes of security policies.

29. The computer-readable storage medium of claim 17 wherein the action is a default action.

30. The computer-readable storage medium of claim 17 wherein the user can modify the action.

31. A system for customizing a security policy that is an implementation of a desired security policy for the computer system, comprising:
   a memory storing
      a security policy store having security policies that include scope, condition, and action information, the scope specifying a scope criterion including values of attributes of a security event that need to be satisfied for a security event to be within the scone of the security policy, the condition specifying a procedure that is to be performed to determine whether a security event matches the security policy, the procedure being computer-executable code to be performed by the computer system based on values of attributes of the security event, and the action specifying an action to take when a within-scope security event satisfies the condition of the security policy;

a component with computer-executable instructions that receives from a user a modification to the scope of a security policy through a user interface, the user interface allowing the user to modify the scone of the security policy but not allowing the user to modify the computer-executable procedure of the condition of the security policy; and a component with computer-executable instructions for modifying, within the security policy store, the scope of the security policy so that the security policy with the modified scope can be applied to security events, the applying of the security policy to security events including when a security event occurs,
determining whether the security event is within the modified scone of the security policy; and when it is determined that the security event is within the modified scone of the security policy,
performing the procedure of the condition of the security policy to determine whether the security event satisfies the condition of the security policy and thus matches the security policy; and
when it is determined that the security event matches the security policy, taking the action of the security policy; and a processor executing instructions of the components.

32. The computer system of claim 31 including a component that takes the action of the security policy.

33. The computer system of claim 31 wherein modification of a criterion of the scope of the security policy is prohibited when the criterion is locked.

34. The computer system of claim 31 wherein the action is a default action.

35. The computer system of claim 31 wherein the user can modify the action.

* * * * *